Aug. 15, 1967

A. W. MAIN ETAL 3,335,681

AGRICULTURAL TILLAGE UNIT

Filed April 26, 1965

INVENTORS:
ANDREW W. MAIN
J. E. SHOULER
IRVIN R. CUTHBERTSON

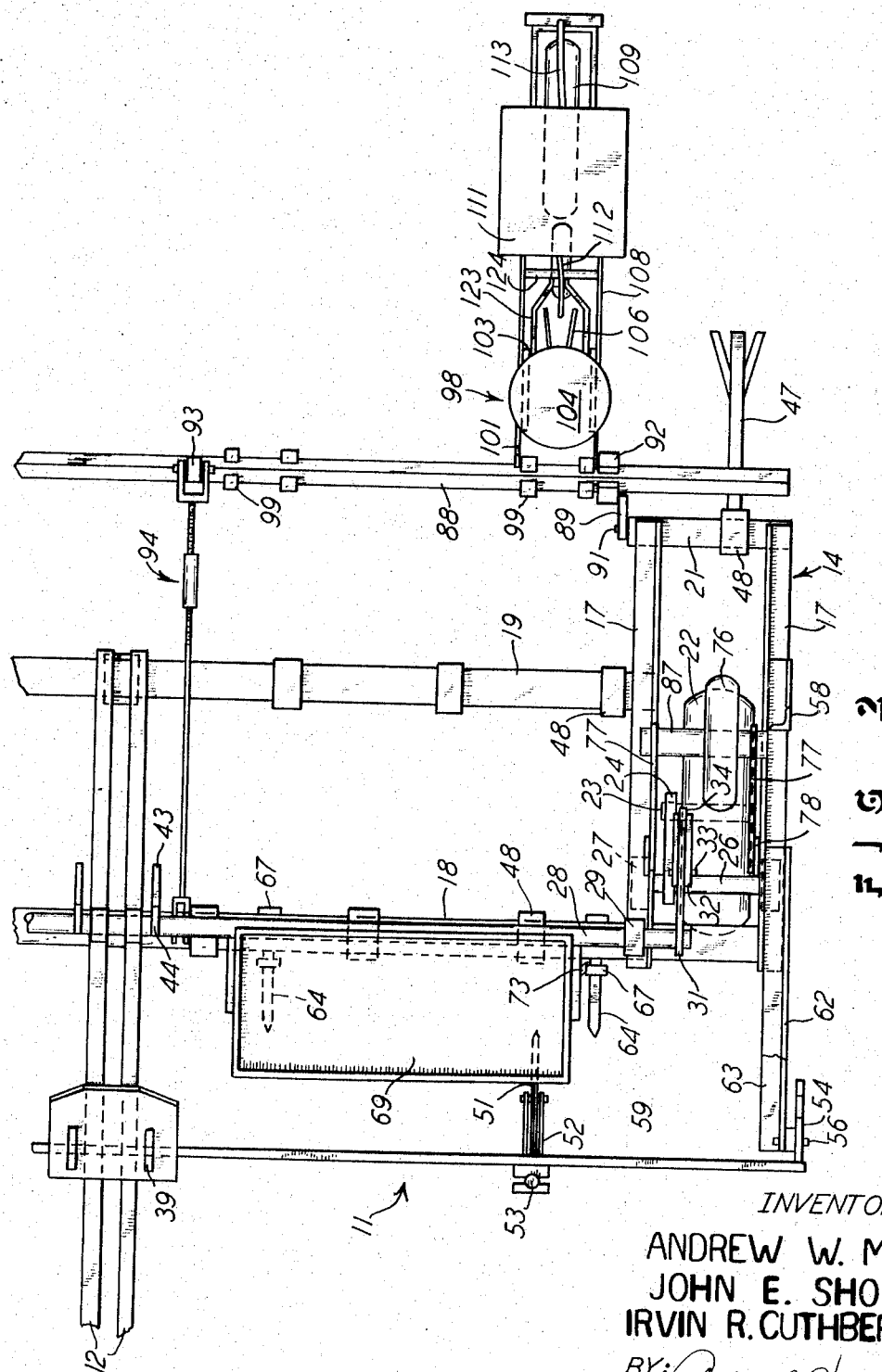

United States Patent Office 3,335,681
Patented Aug. 15, 1967

3,335,681
AGRICULTURAL TILLAGE UNIT
Andrew W. Main, Altona, John E. Shouler, Rockford, and Irvin R. Cuthbertson, Pecatonica, Ill., assignors to J. I. Case Company, Racine, Wis., a corporation of Wisconsin
Filed Apr. 26, 1965, Ser. No. 450,916
7 Claims. (Cl. 111—64)

ABSTRACT OF THE DISCLOSURE

A frame having means for attaching to a tractor (not shown) and having implements attached to and depending from the frame and including means for raising and lowering the implements and means for operating certain ones thereof, such as a fertilizer dispenser and a seed planter. The implements are arranged on the frame in the front-to-rear order of a row of discs, a fertilizer dispenser, chisel plows, a seed planter, and a chemical dispenser. Ground wheels are attached to the frame which is articulate with the wheels to be raised and lowered between the lowered operating position and the raised transport position.

---

This invention relates to a tillage unit for use in agriculture.

Conventional farming practice results in the farmer making frequent trips over the farm land for plowing disking, planting, cultivating, and like functions. These trips of course require considerable time, machinery, investment in machinery as well as maintenance and operating costs of the machinery, and other time and expense considerations. Also, an untimely rain during planting can necessitate another disking or like operation before completion of planting. Of additional concern with regard to these conventional farming practices is the concern of overworking the land by extensive plowing where the less fertile soil is actually brought to the top of the land, as in mold-board plowing for instance. Such plowing usually results in the burying of the previous year's crop so that only soil remains on top. However, such exposed soil is subject to wind and water erosion. Also, the soil is usually over-worked to where it is fairly compact and it will not absorb the moisture and only the top is damp and the farmer must then wait for the sun to dry it off before he can again work the land.

Thus it has heretofore been the conventional practice to make frequent trips over the land in farming. The farmer was concerned about burying every last bit of trash, and he would do so, and he would also vertually pulverize the soil. This eliminates pockets that hold air and moisture, and frequent trips over the soil compact the soil and make it difficult for the crop roots to grow. Heavy rains puddle the soil and create crusts on the surface and moisture cannot soak in but will only run off and increase soil erosion. Also, plant food is then lost and the crop yields are reduced.

It is a general object of this invention to overcome the aforementioned problems and to do so with a tillage unit described herein.

Also, the general objects of this invention are to provide a tillage apparatus which results in higher crop yields per acre, less labor required, less machinery required, less cost in both labor and machinery and supplies and other equipment, less soil compaction, better utilization of moisture, and prevent water run off and loss of fertilizer.

It has been found that the use of the hereinafter described apparatus and method have resulted in substantially increased crop yields per acre and substantially decreased costs per acre. These two fundamental improvements came about with less labor, better use of seed and land and moisture, and with less implements required and used.

Other objects and advantages will become apparent upon reading the following description in light of the accompanying drawings, wherein:

FIG. 2 is a top plan view of FIG. 1 with certain parts thereof removed.

Figure 1:
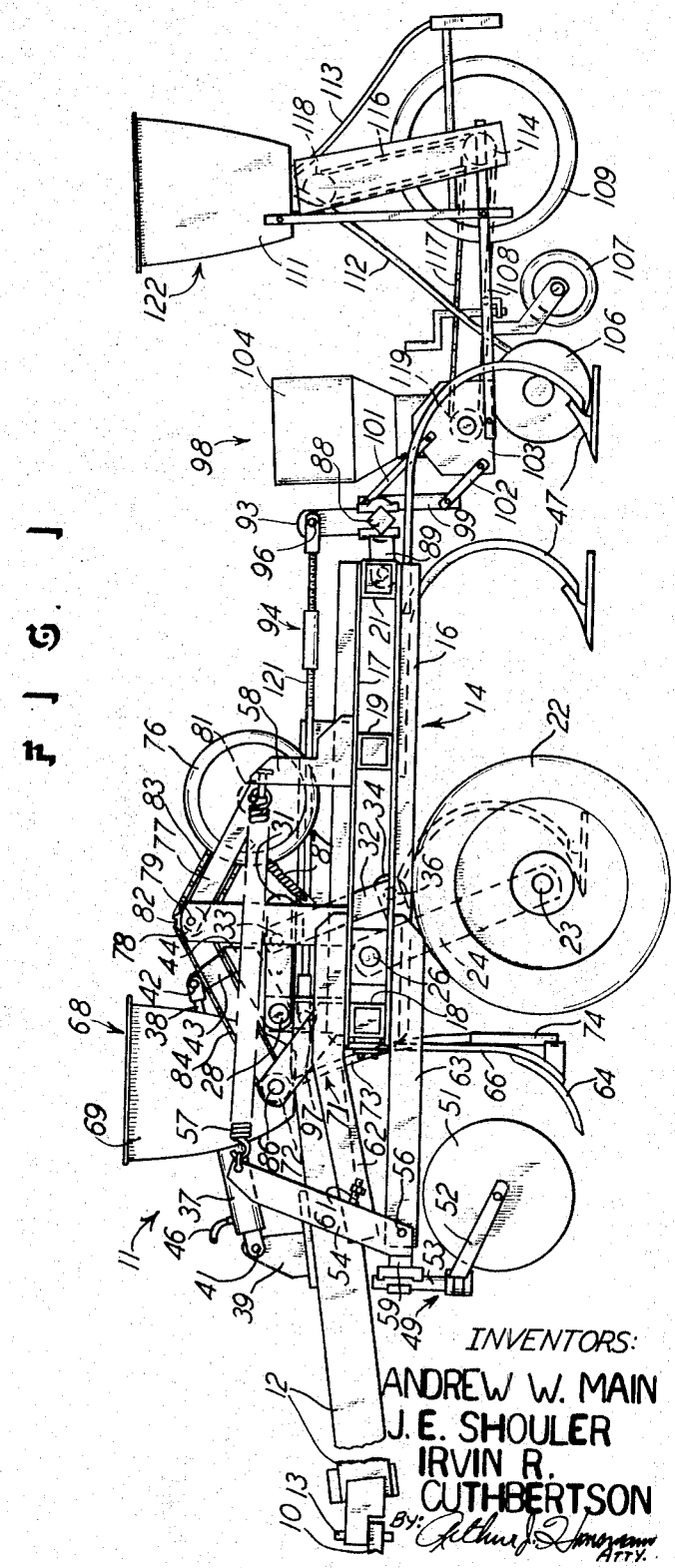
FIG. 1 is a side elevational view of a tillage unit showing one embodiment of this invention.

It will of course be understood that the tillage unit of this invention is normally towed by a tractor which is not shown except for its draw bar designated 10 which would of course extend rearwardly of the tractor for towing the entire tillage unit generally designated 11. The unit 11 has a forwardly projecting tongue 12 which is connected to the tractor draw bar by the pin 13 and is thus pivotal with respect to the tractor. The unit 11 has a frame generally designated 14 which is suitably connected to the tongue 12. The frame 14 consists of a lower angle piece 16 and an upper angle piece 17, disposed on each side of the frame 14. Cross pieces 18 and 19 connect to the side pieces 16 and 17 to form a rigid frame 14 for towing movement by the tractor, all in any known manner of connection. The side pieces 16 and 17 are also connected at their rear ends by a cross piece 21, as also shown in FIG. 2. FIG. 2 is of course showing only the left half of the unit 11, and it will be understood that the other half is identical to the half shown, or at least it may be so.

The frame 14 is supported by a ground wheel 22, rotatably and displaceably mounted on each side of the frame 14. A wheel axle 23 rotatably supports the wheel 22, and a pivot arm 24 connects between the axle 23 and a shaft 26 which pivotally mounts the arm 24 to the frame 14 through a mounting block 27. Thus the wheel 22 can actually be completely displaced up and down about its mounting shaft 26 and thus with respect to the frame 14. Such action will of course raise and lower the frame 14 since the wheel 22 will always remain on the ground to support the unit 11.

The mechanism for raising and lowering the frame 14, that is, for pivoting the link 24, is a linkage pivotally connected between the link 24 and a shaft 28 which is rotatably mounted on the frame 14 by mounting blocks, such as the shown block 29. Thus the shaft 28 has a link 31 affixed thereto to rotate with the rotation of the shaft 28. Another link 32 is pivotally connected with the link 31 at the pivot pin 33. Also, the link 32 is pivotally connected with a link 34 rigidly attached to the link 24, by a pivot pin 36 connecting between the links 32 and 34. It will therefore be understood that counter-clockwise rotation of the shaft 28, as viewed in FIG. 1, will cause the extended end of the link 31 to rise and lift the link 32 and likewise the link 34 and 24. This of course raises the wheel axle 23, and thus raises the wheel 22 relative to the frame 14. As mentioned, actually the frame 14 would be lowered since the wheel 22 will remain on the ground. Thus the unit 11 is shown in the raised or transport position in FIGS. 1 and 2.

To cause the initial rotation of the shaft or member 28, a power means is provided and consists of the hydraulic cylinder 37 with its extended rod 38 as shown in FIG. 1. A mounting plate 39 is secured to the draw bar 12 to support the cylinder 37 through a pivot pin 41. The cylinder rod 38 is connected to the shaft 28 through a pivot pin 42 being connected to a link 43 which in turn is rigid with a link 44 which is also rigid on the shaft 28. Thus extension and contraction of the power means or its rod 38 will cause displacement of the link 43 and corresponding rotation of the shaft 28. It will be further understood that the cylinder 37 has a hydraulic hose 46 which extends to the tractor, and the hydraulic power means is thus controlled by the tractor power supply so that the tillage unit 11 can be readily raised and lowered for the operating functions described hereinafter.

From the foregoing it will be understood how the frame 14 is constructed and how it is raised and lowered by means of the ground wheel 22 and the power means 37. FIG. 2 further shows that there are two side angle pieces 17 included in the frame 14, and there would also be two side angle pieces 16 directly below the pieces 17, as indicated in FIG. 1 with respect to the upper and lower relationship mentioned. Also, there could be two power means of the hydraulic cylinder 37, and here again FIG. 2 shows a mounting plate 39 on each half of the unit, and it also shows connecting plates or links 43 and 44 on each half of the unit.

Attached to the frame 14 and spaced longitudinally and laterally thereon are ground working implements in the form of chisel plows 47. These plows 47 are suspended on the frame 14 and terminate in a common horizontal plane below the frame 14 such than when the frame 14 is raised the lower terminating plane of the plows 47 is above the ground so that the unit is in the transport position as shown. FIG. 2 shows one of the plows 47 in full plan view with its mounting plate 48 shown on the frame cross member 21. The other mounting plates 48 therefore show the location and thus the spacing of the remaining plows 47, though they are not actually fully shown in FIG. 2. It will of course be understood that they are spaced as shown in FIG. 2 for the desired ground plowing, and they are laterally related with respect to other parts hereinafter described. Also note that the one fully shown plow 47 in FIG. 2 is disposed behind the wheel 22 so that the ground otherwise compacted by the wheel 22 will again be plowed and thus loosely disposed as desired.

The forward portion of the frame 14 has a disking unit generally designated 49 mounted thereon. This unit includes disks or coulters 51 which are rotatably supported on arms 52 suspended on shafts 53. An upstanding arm 54 is pivoted to the frame 14 by means of a pin 56 so that the arm may pivot in the fore-and-aft plane of movement of the unit 11. This therefore permits pivotal motion of the row of coulters, such as the one shown coulter 51, and it will be understood that there will be an entire row of coulters 51 across the front of the frame 14. A tension spring 57 is attached to the upper end of the arm 54 and to a stationary bracket 58 on the frame 14. The spring therefore urges the upper end of the arm 54 rearwardly so that the row of coulters can adjust as they proceed over the ground in cutting the ground and any crops which may be left on the ground from the previous year. FIG. 2 shows the coulter mounting bar 59 extending across the front of the frame 14 for support of the row of coulters 51, with the row of course being arranged in any well-known manner depending from the bar 59 which is rigidly connected to the lower end of the arm 54 for the pivotal action about the pin 56, as described.

A stop 61 is mounted on the angle piece 62 which is attached to the frame and is a part thereof and projects forwardly of the frame as shown. The stop 61 therefore abuts the rear surface of the arm 54 at a point above the pivot 56 to limit rearward pivot of the arm 54 against the urging of the spring 57. It will of course also be noted that another angle piece 63 is attached to the frame 14 to be a part thereof and extends forwardly of the frame to provide a mounting of the arm 54 as described. Thus the forwardly extending frame pieces 62 and 63 are rigid parts of the frame 14.

An additional earth working implement designated 64 is attached to and suspended from the frame 14 to terminate in the horizontal plane described with respect to the chisel plows 47. The implement 64 is also of the chisel-type and has its shank 66 suitably connected to the frame cross piece 18 through the clamp plates 67. Thus FIG. 2 shows two of the implements 64 on one-half of the frame 14, and it further shows that these implements are offset laterally from the position of any of the chisel plows 47. It will be further understood that the implement 64 will engage the ground and slide through the ground in the forward movement of the unit 11.

A fertilizer container and dispenser, generally designated 68, is mounted on the frame 14 and includes a container 69 and dispensing means generally designated 71. The means 71 includes a sprocket 72 and a tube 73, with the latter extending from the container 69 to a point rearward of the implement 64, and this location is designated 74. It will therefore be understood that in a conventional manner the fertilizer means 68 is operated to dispense fertilizer through the tube or outlet means 71 and down to its lower end 74, and this location is directly in line with and behind the chisel-type opener 64.

A means for rotating the fertilizer dispenser sprocket or drive 72 includes the wheel 76 which is rotatably mounted on the frame and which engages the wheel 22 when the frame is placed in the lower or operative position. Thus the wheel 76 rides on the top of the wheel 22 to be rotated by the wheel 22, and through a chain and sprocket drive connection, the fertilizer drive means or sprocket 72 is operated. The wheel 76 is rotatably mounted on a pivotal link 77 which is in turn supported on a stationary bracket 78 on the frame 14. The link 77 can thus pivot about its mounting pin 79 on the bracket 78. The wheel 76 has a sprocket 81 on the axle thereof, and the bracket 78 has a sprocket 82 on the pin or axis 79. Thus a chain 83 extends between the wheel sprocket 81 and the bracket sprocket 82, and another chain 84 extends from the bracket sprocket 82, which is thus a double sprocket, to the sprocket 72. The latter has a shaft 86 which extends into the container or box 69 to actuate a conventional drive therein for dispensing fertilizer through the tube 73. Also, a tension spring 87 extends between the bracket 78 and the wheel arm 77 to urge the latter downwardly and thus against the wheel 22 when the two wheels are in driving engagement. Actually, the wheel 22 can be considered to have been rotated upwardly about its pivot 26 to engage the wheel 76 for the driving relation just described.

The wheel 76 has its axle 87, shown in FIG. 2, supported on the ends of two links 77.

A tool bar 88 is pivotally attached to the rear end of the frame 14 by means of the link 89 and pivot pin 91. The link 89 is connected to a clamp indicated 92 which is affixed to the tool bar 88 in any conventional manner. Thus the bar 88 can move up and down, and in fact it does so with the normal articulation necessary in utilizing the tillage unit and with the raising and lowering of the frame 14 as now described. The bar 88 has a link 93 rigid therewith and extending thereabove and connecting to a turnbuckle unit 94. The unit 94 is pivoted to the link 93 by a pin 96, and the unit extends forwardly to a link 97 affixed to and depending below the rock shaft 28. Thus the forward end of the turnbuckle unit 94 is pivoted to the rock shaft link 97 such that when the shaft 28 is rotated, the link 97 is displaced to correspondingly displace the unit 94 and thus pivot the link 93 and tool bar 88 about the mounting pin 91. From the position shown in FIG. 1, when the power cylinder 37 is retracted, the rock shaft 28 would be caused to rotate counter-clockwise as viewed in FIG. 1, and this would cause the turnbuckle unit 94 to be displaced to the right and thus rotate the tool bar 88 clockwise about the pin 91. This will lower the planter unit generally designated 98 and affixed to the rear end of the frame 14 in the articulated manner described.

The planter units 98 include a clamping frame 99 and parallel linkage comprised of links 101 and 102 which are respectively pivoted to the clamp 99 and a plate 103 as shown. The planter units 98 also include the container 104 which contains seed, and it includes the opener 106 and the press wheel 107. Supporting bars 108 connect to the plates 103 and extend rearwardly therefrom to support both a ground wheel 109 and a chemical container 111. The chemical container and dispenser unit 111 includes the forwardly extending tube 112 and the rearwardly extending tube 113, both of which extend to a point near the ground for dispensing of desired chemicals such as pesticides and herbicides, with the herbicide being in the tube 113 and dispensed after the wheel 107 and the wheel 109 have compacted the ground over the seed dispensed by the planter unit 98. The seed would of course be dispensed in the usual manner directly at the point of the opener 106 which is shown to be of the rolling or rotating type and which is of a common construction. Operation of the planter 98 would of course dole out the seeds and cause them to fall into the rows or openings made in the ground by the opener 106. Here it also will be noted that there will be a plurality of the planters 98 and chemical container and dispenser units attached to the tillage unit as a part thereof, and FIG. 2 shows the planter clamp 99 in two locations on the one-half of the unit shown in FIG. 2. Thus, there will be a four row planter provided in the unit described herein with two planters on each half as shown.

The ground wheel 109 will of course engage and roll upon the ground in response to the towing of the unit 11, and this will occur when the planter unit 98 and chemical unit trailing behind are rotated slightly clockwise to be in their operative position which would be level with the frame 14. The ground wheel 109 then is operatively connected to the chemical dispenser unit and is also operatively connected to the planter unit, through the sprocket and chains described. Wheel 109 has a sprocket 114 shown thereon, and there would be another like sprocket 114 which rotates with the rotation of the wheel 109. Each of the sprockets 114 has a drive chain 116 and 117 extended thereon and extending respectively to sprockets 118 and 119 on the chemical dispenser and the planter. Thus it will be understood that in a conventional manner the ground wheel 109 will operate both the chemical dispenser and the planter when the unit is placed in the operative position and towed over the ground so that wheel 109 will rotate.

FIG. 2 shows that the planter 98, and of course its dispensing means and opener 106, are located slightly laterally offset from the fertilizer opener 64 and dispenser 74. This therefore permits fertilizing the soil and seeding the soil without causing the seed to drop directly on the fertilizer since both operations are performed in one pass or trip over the ground. Also, it will now be understood that the turnbuckle unit 94 is adjustable by means of the threaded sections 121, and such adjustment therefore actually controls the pivoted relation of the planter 98 with respect to the frame 14. This in turn therefore controls the depth of planting with respect to the frame 14, as desired.

The planter 98 and the dispenser container unit now designated 122, are rigidly connected together so that they can both be raised upon pivoting of the tool bar 88 as described. However, they can both articulate upwardly for necessary adjustment to the ground in the operative position, but they cannot pivot downwardly and can thereby be raised as mentioned. To effect the raising, a linkage connection 123 extends from the planter plate 103 to a cross tube 124 connected between the links 108. The linkage 123 connects with the tube 124 upon raising the linkage 123, and this therefore in turn raises the tube 124 and thus the links 108 and the chemical container and dispenser unit 122, as indicated and desired. Such connection can thus be made in any conventional and well-known manner, just so the planter unit 98 and the chemical dispenser unit 122 can both be raised with the pivoting of the tool bar 88.

It will therefore be noted that there is shown and disclosed a tillage unit which disks the crops, opens a furrow and fertilizes same, plows the field, plants the seed, dispenses a pesticide, covers the seed, and finally dispenses a herbicide, if the latter be desired, and this is all done in one pass over the field without any additional maneuvering for that particular springtime planting. The field was preferably initially disked in the previous fall of the year, but the cut stalks and the like of the previous year's crop are left on the top surface of the ground until the spring working of the ground as just described. This obviously reduces the number of trips required in the farming, and it results in the advantages mentioned in the beginning of this description. This latter portion therefore describes the method of tilling, and this may also be referred to and considered as a mulch tillage concept or method since the previous year's crops are not completely plowed under but are actually left upon or simply imbedded in the top soil of the farm. This concept with chisel-type plowing is bound to be preferred since the chisel plows will make a furrow by clearing the mulch out of the furrow as the plows move through the ground. A method to be used for planting corn in a previously planted corn field would be to shred the stalks in early fall and to then chisel plow to uproot the plants and remove hard spots, and level the rows' ridges. This mixes in the old stalks and prevents erosion, and the ground will freeze deeper and weather out faster than it would without this method or with mold-board plowing which compacts the ground. Then in the spring the field can be chisel plowed and planted, all in one trip over the field. The field can be disked, just prior to planting, if needed for preventing plugging of plow. Also, the apparatus can be used to mulch-till at mid-year, and then plant a second crop in that same year, instead of the fall and spring seasons mentioned above.

Note also that there are fifteen chisel plows indicated in FIG. 2 for the four-row planter. This normally permits passage over the mulch-tillage field without plugging of the plow. These chisel plows have twelve inch sweeps and the entire unit provides forty-inch rows. If necessary to avoid plugging, wider sweeps could be used on fewer plow shanks.

While specific apparatus of this invention has been shown and described, it should be obvious that certain changes could be made and the invention should therefore be determined only by the scope of the appended claims.

What is claimed is:

1. A tillage unit to be drawn by a tractor and powered therefrom for fertilizing, plowing, planting, and chemical applications, comprising a frame, a plurality of earth tilling implements suspended from said frame and terminating therebelow on a plane and spaced apart in both lateral and longitudinal spacing with respect to the direction of operative movement of said unit for plowing, additional earth tilling implements suspended from said frame and terminating therebelow on said plane to form furrows, a fertilizer container and dispenser unit mounted on said frame and having dispenser means extending to said additional earth tilling implements for dispensing fertilizer in said furrows formed by said additional earth tilling implements, ground wheels rotatably and displaceably mounted on said frame for up-and-down movement with respect to said frame to raise and lower said frame with respect to the ground and with the raising being to a height sufficient to have said plane spaced above the ground for the transport of said unit, power means connected to said frame and operatively connected to said ground wheels for displacing the latter to raise and lower said frame, drive means connected to said fertilizer dispenser means and operatively connected with said ground wheels upon lowering of said frame for operating said fertilizer means for dispensing fertilizer in quantities in relation to the speed of rotation of said ground wheels, a tool bar pivotally attached to the rear of said frame for up-and-down movement on said frame, means connected between said power means and said tool bar for moving the latter up and down in unison with the raising and lowering of said frame, planter units attached to said tool bar and disposed rearwardly of said frame to be raised and lowered with the raising and lowering of said tool bar and thereby be raised off the ground and with said planter units including dispensing means having seed outlet means located slightly laterally offset from said additional earth tilling implements for dispensing seed onto the ground in rows slightly offset from said furrows, a chemical container and dispenser unit attached to each of said planter units to be raised and lowered therewith and disposed rearward thereof and including chemical dispensing means for dispensing chemicals onto the ground, an additional ground wheel rotatably attached to each of said planter units to be raised and lowered therewith and disposed rearwardly of each of said planter units in longitudinal alignment with said seed outlet means, and drive means operatively connected between each of said additional ground wheel and both of said seed and chemical dispensing means for operating the latter two for dispensing seeds and chemicals in relation to the speed of rotation of said additional ground wheel.

2. A tillage unit to be drawn by a tractor and powered therefrom for sequential fertilizing, plowing, planting, and chemical applications, comprising a frame, a plurality of chisel plows suspended from said frame and terminating therebelow on a plane and spaced apart in both lateral and longitudinal spacing with respect to the direction of operative movement of said unit for plowing, additional chisel plows suspended from said frame and terminating therebelow on said plane to form furrows, a fertilizer container and dispenser unit mounted on said frame and having dispenser means extending to said additional chisel plows for dispensing fertilizer in said furrows formed by said additional chisel plows, ground wheels rotatably and displaceably mounted on said frame for up-and-down movement with respect to said frame and with the raising being to a height sufficient to have said plane spaced above the ground for the transport of said unit, power means connected to said frame and operatively connected to said ground wheels for displacing the latter to raise and lower said frame, drive means connected to said fertilizer dispenser means and operatively connected with said ground wheels upon lowering of said frame for operating said fertilizer means for dispensing fertilizer in quantities in relation to the speed of rotation of said ground wheels, a tool bar pivotally attached to the rear of said frame for up-and-down movement on said frame, tension means connected between said power means and said tool bar for moving the latter up and down in unison with the raising and lowering of said frame, said tension means being adjustable in its connection between said power means and said tool bar for adjustably setting the limit of pivot of said tool bar on said frame in one direction, planter units attached to said tool bar and disposed rearwardly of said frame to the side of said tool bar in the direction of the limit of pivot to be raised and lowered with the raising and lowering of said tool bar and thereby be raised off the ground and to be selectively set in depth of planting, said planter units including dispensing means having seed outlet means located slightly laterally offset from said additional chisel plows for dispensing seed onto the ground in rows slightly offset from said furrows, a chemical container and dispenser unit attached to each of said planter units to be raised and lowered therewith and disposed rearward thereof and including chemical dispensing means for dispensing chemicals onto the ground, an additional ground wheel rotatably attached to each of said planter units to be raised and lowered therewith and disposed rearwardly of each of said planter units in longitudinal alignment with said seed outlet means, and drive means operatively connected between each of said additional ground wheel and both of said seed and chemical dispensing means for operating the latter two for dispensing seeds and chemicals in relation to the speed of rotation of said additional ground wheel.

3. A tillage unit for sequential disking, fertilizing, plowing, planting, and chemical applications, comprising a frame, a row of coulters rotatably mounted on said frame and disposed below the forward end thereof, a plurality of chisel plows suspended from said frame and terminating therebelow behind said row of coulters on a plane substantially level with the lower limit of said coulters and spaced apart in both lateral and longitudinal spacing with respect to the direction of operative movement of said unit for plowing, additional chisel plows suspended from said frame and terminating therebelow on said plane to form furrows, a fertilizer container and dispenser unit mounted on said frame and having dispenser means extending to said additional chisel plows for dispensing fertilizer in said furrows formed by said additional chisel plows, ground wheels rotatably and displaceably mounted on said frame for up-and-down movement with respect to said frame to raise and lower said frame with respect to the ground and with the raising being to a height sufficient to have said plane spaced above the ground for the transport of said unit, power means connected to said frame and operatively connected to said ground wheels for displacing the latter to raise and lower said frame, drive means connected to said fertilizer dispenser means and operatively connected with said ground wheels upon lowering of said frame for operating said fertilizer means for dispensing fertilizer in quantities in relation to the speed of rotation of said ground wheels, a tool bar pivotally attached to the rear of said frame for up-and-down movement on said frame, means connected between said power means and said tool bar for moving the latter up and down in unison with the raising and lowering of said frame, planter units attached to said tool bar and disposed rearwardly of said frame to be raised and lowered with the raising and lowering of said tool bar and thereby be raised off the ground and with said planter units including dispensing means having seed outlet means located slightly laterally offset from said additional chisel plows for dispensing seed onto the ground in rows slightly offset from said furrows, a chemical container and dispenser unit attached to each of said planter units to be raised and lowered therewith and disposed rearward thereof and including chemical dispensing means for dispensing chemicals onto the ground, an additional ground wheel rotatably attached to each of said planter units to be raised and lowered therewith and disposed rearwardly of each of said planter units in longitudinal alignment with said seed outlet means, and drive means operatively connected between each of said additional ground wheel and both of said seed and chemical dispensing means for operating the latter two for dispensing seeds and chemicals in relation to the speed of rotation of said additional ground wheel.

4. A tillage unit for sequential disking, fertilizing, plowing and planting, comprising a frame, a row of coulters rotatably mounted on said frame and disposed below the forward end thereof, a plurality of chisel plows suspended from said frame and terminating therebelow behind said row of coulters on a plane substantially level with the lower limit of said coulters and spaced apart in both lateral and longitudinal spacing with respect to the direction of operative movement of said unit for plowing, additional chisel plows suspended from said frame and terminating therebelow on said plane to form furrows, a fertilizer container and dispenser unit mounted on said frame and having dispenser means extending to said additional chisel plows for dispensing fertilizer in said furrows formed by said additional chisel plows, ground wheels rotatably and displaceably mounted on said frame for up-and-down movement with respect to said frame to raise and lower said frame with respect to the ground and with the raising being to a height sufficient to have said plane spaced above the ground for the transport of said unit, power means connected to said frame and operatively connected to said ground wheels for displacing the latter to raise and lower said frame, drive means connected to said fertilizer dispenser means and operatively connected with said ground wheels upon lowering of said frame for operating said fertilizer means for dispensing fertilizer in quantities in relation to the speed of rotation of said ground wheels, a tool bar pivotally attached to the rear of said frame for up-and-down movement on said frame, means connected between said power means and said tool bar for moving the latter up and down in unison with the raising and lowering of said frame, planter units attached to said tool bar and disposed rearwardly of said frame to be raised and lowered with the raising and lowering of said tool bar and thereby be raised off the ground and with said planter units including dispensing means having seed outlet means located slightly laterally offset from said additional chisel plows for dispensing seed onto the ground in rows slightly offset from said furrows, an additional ground wheel rotatably attached to each of said planter units to be raised and lowered therewith and disposed rearwardly of each of said planter units in longitudinal alignment with said seed outlet means, and drive means operatively connected between each of said additional ground wheel and said seed dispensing means for operating the latter for dispensing seeds in relation to the speed of rotation of said additional ground wheel.

5. A tillage unit for sequential fertilizing, plowing, planting, and chemical applications, comprising a frame, a plurality of chisel plows suspended from said frame and terminating therebelow and spaced apart in both lateral and longitudinal spacing with respect to the direction of operative movement of said unit for plowing, additional chisel plows suspended from said frame and terminating therebelow on said plane to form furrows, a fertilizer container and dispenser unit mounted on said frame and having dispenser means extending to said additional chisel plows for dispensing fertilizer in said furrows formed by said additional chisel plows, ground wheels rotatably and displaceably mounted on said frame for up-and-down movement with respect to said frame to raise and lower said frame with respect to the ground and with the raising being to a height sufficient to have said plane spaced above the ground for the transport of said unit, power means connected to said frame and operatively connected to said ground wheels for displacing the latter to raise and and lower said frame, drive means connected to said fertilizer dispenser means and operatively connected with said ground wheels upon lowering of said frame for operating said fertilizer means for dispensing fertilizer in quantities in relation to the speed of rotation of said ground wheels, planter units attached to said frame and disposed rearwardly of said frame to be raised and lowered with the raising and lowering of said frame and thereby be raised off the ground and with asid planter units including dispensing means having seed outlet means located slightly laterally offset from said additional chisel plows for dispensing seed onto the ground in rows slightly offset from said furrows, a chemical container and dispenser unit attached to each of said planter units to be raised and lowered therewith and disposed rearward thereof and including chemical dispensing means for dispensing chemicals onto the ground, an additional ground wheel rotatably attached to each of said planter units to be raised and lowered therewith and disposed rearwardly of each of said planter units in longitudinal alignment with said seed outlet means, and drive means operatively connected between each of said additional ground wheel and both of said seed and chemical dispensing means for operating the latter two for dispensing seeds and chemicals in relation to the speed of rotation of said additional ground wheel.

6. A tillage unit for sequential disking, fertilizing, plowing, planting, and chemical applications, comprising a frame, a row of coulters rotatably mounted on the front end of said frame and suspended therebelow, a plurality of chisel plows suspended from said frame and terminating therebelow behind said row of coulters on a plane level with the lower limit of said coulters and spaced apart in both lateral and longitudinal spacing with respect to the direction of operative movement of said unit for plowing, additional chisel plows suspended from said frame and terminating therebelow on said plane to form furrows, a fertilizer container and dispenser unit mounted on said frame and having dispenser means extending to said additional chisel plows for dispensing fertilizer in said furrows formed by said additional chisel plows, ground wheels rotatably and displaceably mounted on said frame for up-and-down movement with respect to said frame to raise and lower said frame with respect to the ground and with the raising being to a height sufficient to have said plane spaced above the ground for the transport of said unit, power means connected to said frame and operatively connected to said ground wheels for displacing the latter to raise and lower said frame, drive means connected to said fertilizer dispenser means and operatively connected with said ground wheels upon lowering of said frame for operating said fertilizer means for dispensing fertilizer in quantities in relation to the speed of rotation of said ground wheels, planter units attached to said frame and disposed rearwardly of said frame to be rainsed and lowered with the raising and lowering of said frame and thereby be raised off the ground and with said planter units including dispensing means having seed outlet means located slightly laterally offset from said additional chisel plows for dispensing seed onto the ground in rows slightly offset from said furrows, a chemical container and dispenser unit attached to each of said planter units to be raised and lowered therewith and disposed rearward thereof and including chemical dispensing means for dispensing chemicals onto the ground, an additional ground wheel rotatably attached to each of said planter units to be raised and lowered therewith and disposed rearwardly of each of said planter units in longitudinal alignment with said seed outlet means, and drive means operatively connected between each of said additional ground wheel and both of said seed and chemical dispensing means for operating the latter two for dispensing seeds and chemicals in relation to the speed of rotation of said additional ground wheel.

7. A tillage unit for sequential fertilizing, plowing, planting, and dispensing chemicals, comprising a frame, a plurality of chisel plows suspended from said frame, additional chisel plows suspended from said frame and terminating therebelow, a fertilizer container and dispenser unit mounted on said frame and having dispenser means extending to said additional chisel plows for dispensing fertilizer therebehind, ground wheels rotatably and displaceably mounted on said frame for up-and-down movement with respect to said frame to raise and lower said frame with respect to the ground and with the raising being to a height sufficient to have all said chisel plows spaced above the ground for the transport of said unit, power means on said frame and operatively connected to said ground wheels for displacing the latter to raise and lower said frame, drive means connected to said fertilizer dispenser means and operatively connected with said ground wheels upon lowering of said frame for dispensing fertilizer in quantities in relation to the speed of rotation of said ground wheels, planter units attached to said frame and disposed rearwardly thereof for raising and lowering with the raising and lowering of said frame and including dispensing means for dispensing seed onto the ground, a chemical container and dispenser unit attached to said planter unit to be raised and lowered therewith and disposed rearward thereof and including chemical dispensing means for dispensing chemicals onto the ground, an additional ground wheel rotatably attached to each of said planter units to be raised and lowered therewith and disposed rearwardly of each of said planter units, and drive means operatively connected between said additional ground wheel and both of said seed chemical dispensing means for operating the latter two in relation to the speed of rotation of said additional ground wheel.

References Cited

UNITED STATES PATENTS

| | | |
|---|---|---|
| 2,842,899 | 7/1958 | Padrick. |
| 3,154,030 | 10/1964 | Williams _ _ _ _ _ _ _ _ _ _ _ _ 111—1 |
| 3,224,392 | 12/1965 | Mellen _ _ _ _ _ _ _ _ _ _ _ _ _ _ 111—52 |

ABRAHAM G. STONE, *Primary Examiner.*

R. CARTER, *Assistant Examiner.*